US008903352B2

(12) United States Patent
Ou et al.

(10) Patent No.: US 8,903,352 B2
(45) Date of Patent: Dec. 2, 2014

(54) METHOD AND APPARATUS FOR IMPROVING WAIT TIME IN A WIRELESS COMMUNICATION SYSTEM

(75) Inventors: Meng-Hui Ou, Taipei (TW); Yu-Hsuan Guo, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 6 days.

(21) Appl. No.: 13/331,345

(22) Filed: Dec. 20, 2011

(65) Prior Publication Data

US 2012/0157033 A1 Jun. 21, 2012

Related U.S. Application Data

(60) Provisional application No. 61/444,301, filed on Feb. 18, 2011, provisional application No. 61/425,688, filed on Dec. 21, 2010.

(51) Int. Cl.
*H04W 68/00* (2009.01)
*H04W 74/04* (2009.01)
*H04W 76/02* (2009.01)

(52) U.S. Cl.
CPC ............ *H04W 74/04* (2013.01); *H04W 76/02* (2013.01)
USPC ........................................ 455/404.1; 370/329

(58) Field of Classification Search
CPC ..... H04W 24/08; H04W 24/00; H04W 68/00; H04W 4/22
USPC ............ 455/404.1, 458, 550, 452.2; 370/329, 370/335
See application file for complete search history.

(56) References Cited

U.S. PATENT DOCUMENTS

| | | | |
|---|---|---|---|
| 2003/0223388 A1* | 12/2003 | Agashe et al. | 370/329 |
| 2007/0223433 A1 | 9/2007 | Watanabe | |
| 2008/0287126 A1 | 11/2008 | Kuo | |
| 2010/0190488 A1 | 7/2010 | Jung et al. | |

FOREIGN PATENT DOCUMENTS

| | | |
|---|---|---|
| JP | 2007266725 A | 10/2007 |
| JP | 2008289148 A | 11/2008 |
| KR | 20080101806 A | 11/2008 |
| WO | 2007015460 A1 | 2/2007 |
| WO | 2009133599 A1 | 11/2009 |

OTHER PUBLICATIONS

3GPP TSG SA WG2 Meeting#81, Oct. 11-15, 2010, Prague, Czech Republic (S2-105078).
Search Report on corresponding EP Patent Application No. 11009965.2 dated Mar. 15, 2012.
Office Action on corresponding foreign application (JP 2011-277854) from JPO dated Apr. 2, 2013.
3GPP TSG SA WG2 Meeting #81, Oct. 11-15, 2010, Prague, Czech Republic (S2-105078).

(Continued)

*Primary Examiner* — Phuoc H Doan
(74) *Attorney, Agent, or Firm* — Blue Capital Law Firm, P.C.

(57) ABSTRACT

A method and apparatus for improving wait time in a wireless communication system are disclosed. The method includes receiving a message indicating an eWaitTime at a user equipment (UE), entering a wait time period corresponding to the eWaitTime, and does not initiate a connection request with a specific cause during the wait time period, and considering the wait time period finished upon receiving a paging message that pages the UE.

18 Claims, 7 Drawing Sheets

(56) References Cited

OTHER PUBLICATIONS

3GPP TSG-RAN WG2 Meeting #72, Jacksonville, U.S.A. Nov. 15-19, 2010 (R2-106931).
Office Action on corresponding foreign application (KR 10-2011-0139221) from KIPO dated May 23, 2013.
Office Action on corresponding foreign application (KR 10-2011-0139222) from KIPO dated May 28, 2013.
3GPP TSG-RAN WG2 Meeting #72, Jacksonville, U.S.A., Nov. 15-19, 2010 (R2-106931).
3GPP TS 37.320 V10.0.0 (Dec. 2010).
Office Action on corresponding foreign application (TW 100147698) from TIPO dated Jan. 20, 2014.

* cited by examiner

METHOD AND APPARATUS FOR IMPROVING WAIT TIME IN A WIRELESS COMMUNICATION SYSTEM

CROSS-REFERENCE TO RELATED APPLICATIONS

The present Application claims the benefit of U.S. Provisional Patent Application Ser. No. 61/444,301, filed on Feb. 18, 2011, and U.S. Provisional Patent Application Ser. No. 61/425,688, filed on Dec. 21, 2010, the entire disclosures of which are incorporated herein by reference.

FIELD

This disclosure generally relates to wireless communication networks, and more particularly, to a method and apparatus for improving wait time in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus for improving wait time in a wireless communication system are disclosed. The method includes receiving a message indicating an eWaitTime at a user equipment (UE), entering a wait time period corresponding to the eWaitTime, and does not initiate a connection request with a specific cause during the wait time period, and considering the wait time period finished upon receiving a paging message that pages the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA). 3GPP UMTS (Universal Mobile Telecommunications System), 3GPP LTE (Long Term Evolution) wireless access. 3GPP LTE-A (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including RP-101026. 3GPP™ Work Item Description, "RAN mechanisms to avoid CN overload due to Machine-Type Communications"; TS 36.413 v9.4.0, "Evolved Universal Terrestrial Radio Access (E-UTRA); S1 Application Protocol (S1AP) (Release 9)"; TS 36.331 v9.4.0, "Evolved Universal Terrestrial Radio Access (E-UTRA); Radio Resource Control (RRC); Protocol specification (Release 9)"; S2-105318. "Reply LS on Release 10 NIMTC Conclusions", SA2: TS 36.331 v10.0.0, "Evolved Universal Terrestrial Radio Access (E-UTRA); Radio Resource Control (RRC): Protocol specification (Release 10)"; R2-110711, "3GPP RAN2#72bis meeting minute"; TS 25.331 v10.2.0, "Radio Resource Control (RRC); Protocol specification (Release 10)"; TS 36.321 v10.0.0, "Evolved Universal Terrestrial Radio Access (E-UTRA): Medium Access Control (MAC); Protocol specification (Release 10)"; TS 23.401 v10.2.0, "General Packet Radio Service (GPRS) enhancements for Evolved Universal Terrestrial Radio Access Network (E-UTRAN) access (Release 10)". The standards and documents listed above are hereby expressly incorporated herein.

Figure 1:
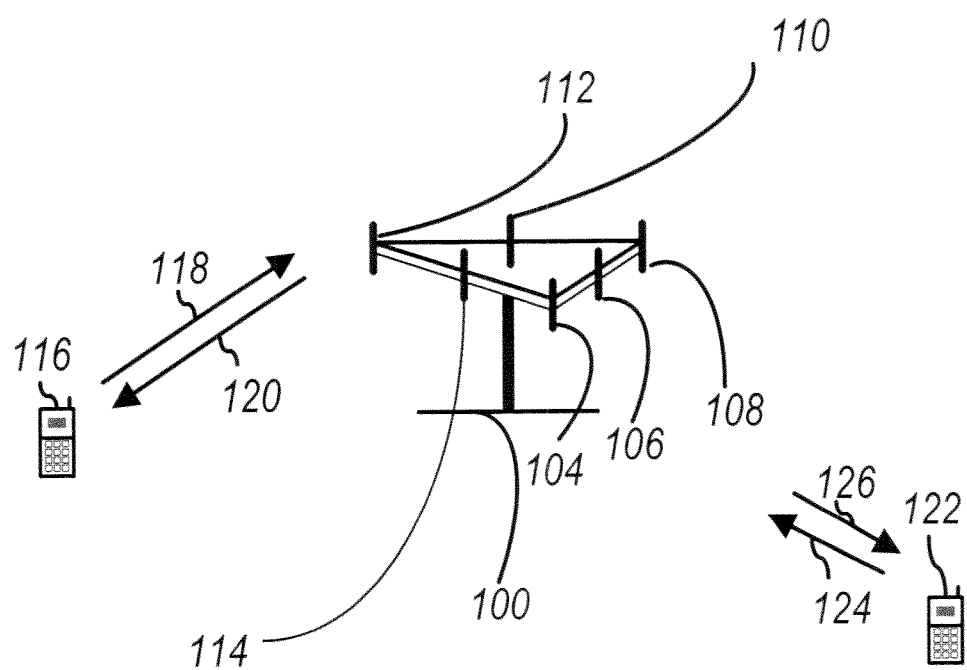
FIG. 1 shows a diagram of a wireless communication according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
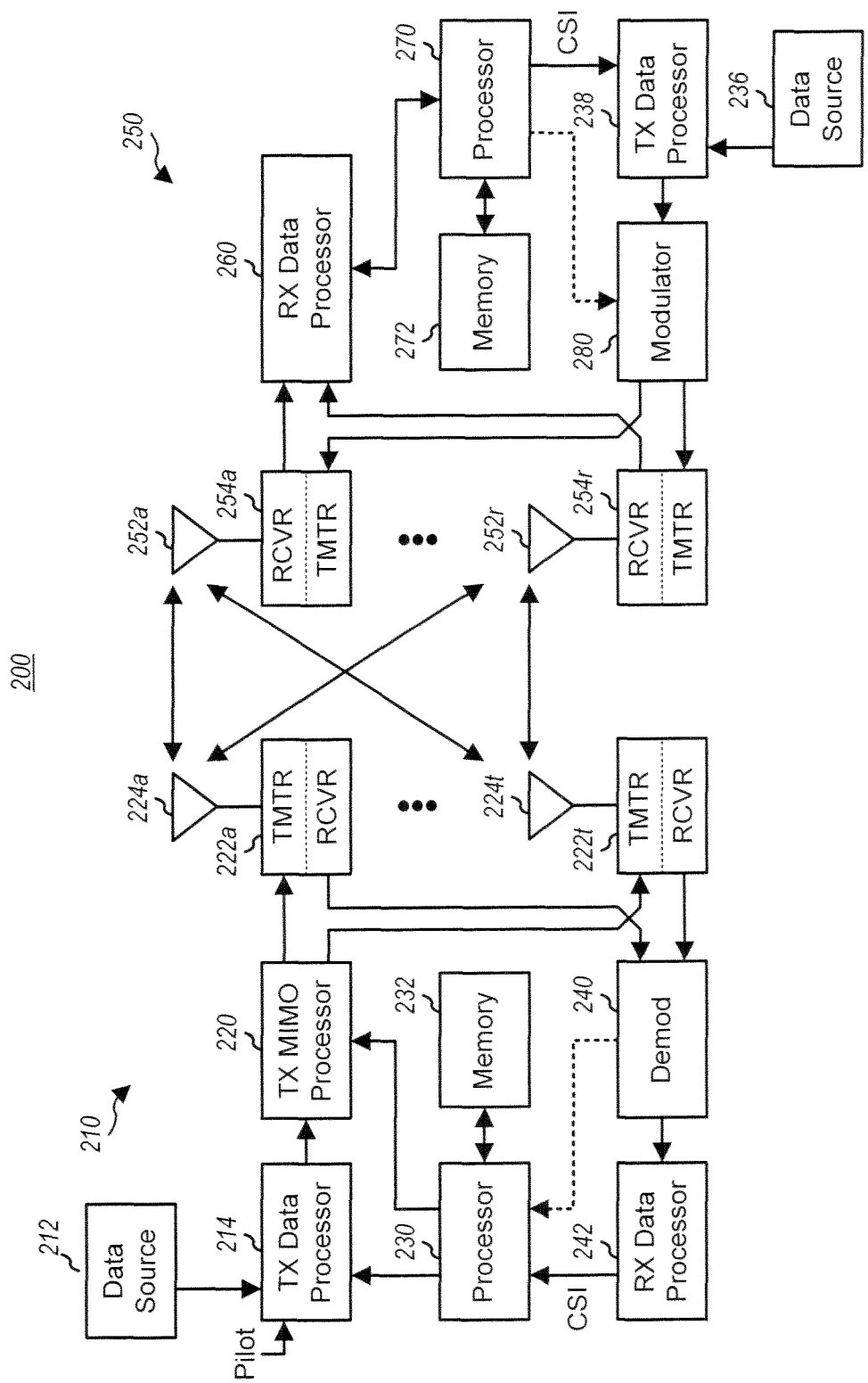
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MINIO processor 220, which may further process the modulation symbols (e.g. for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g. filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MINIO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
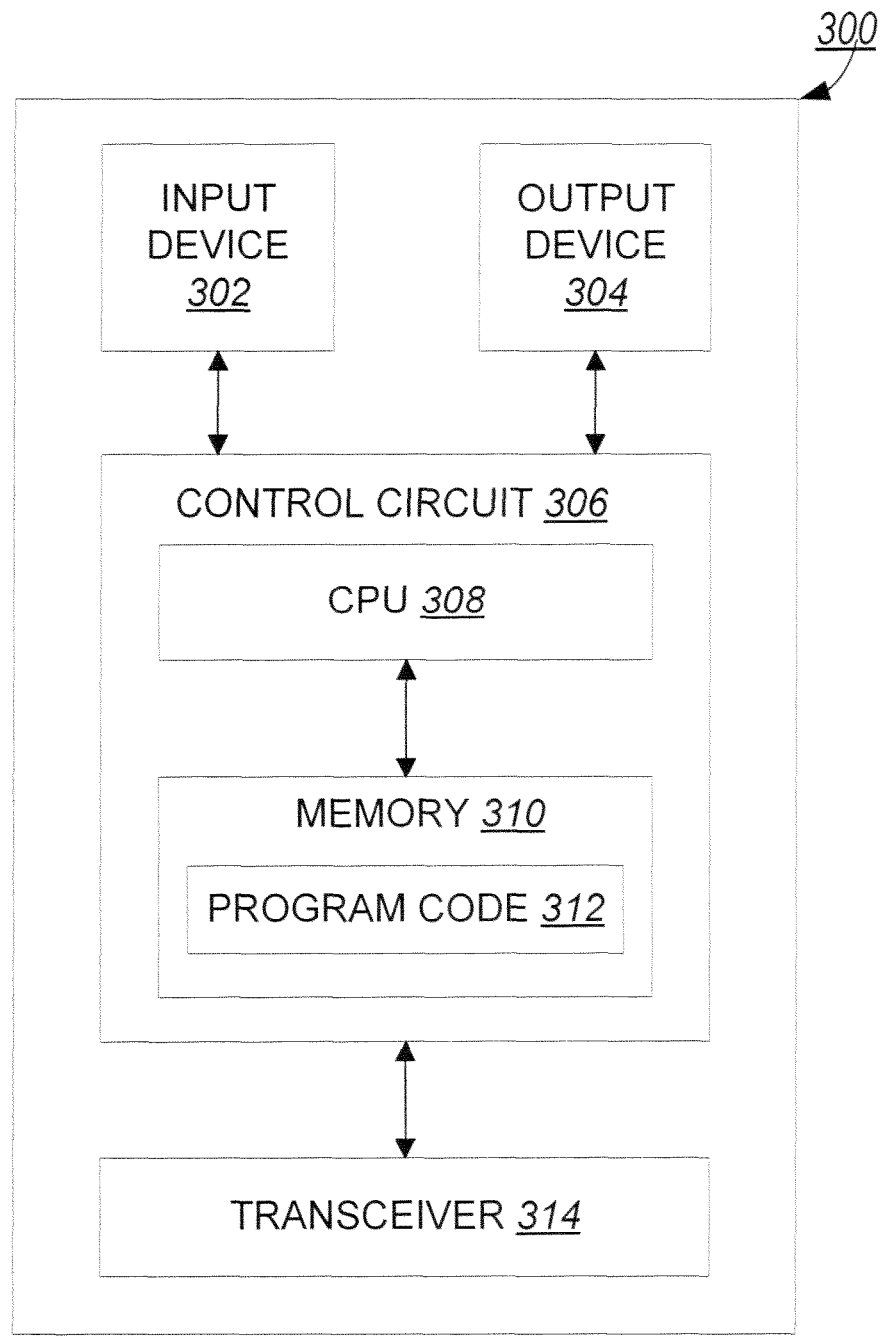
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE-A system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
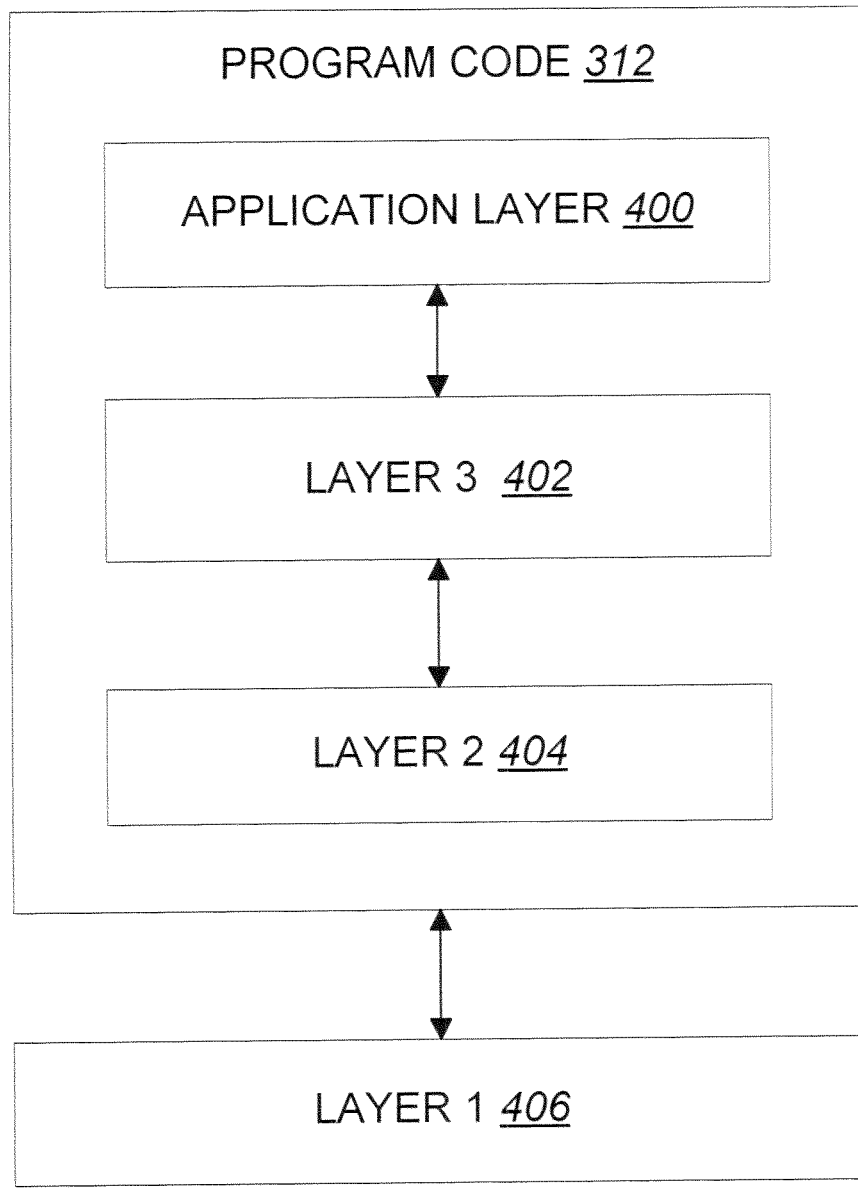
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Figure 5A:
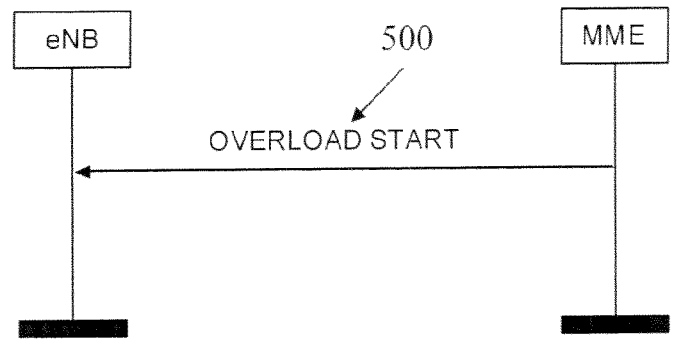
FIGS. 5A, 5B, and 5C are diagrams showing message flows between a UE and network nodes according to one exemplary embodiment.

RP-101026 discusses some mechanism for protecting the CN (Core Network) from overloading due to MTC (Machine-type Communication). It has been identified that the total signaling from large numbers of MTC devices is a concern at least when an application requests many MTC devices to do "something" at the same time or when many MTC devices are roamers and their serving network fails, then they can all move onto the local competing networks, and potentially overload the not (yet) failed network(s). So, proposals have been made to introduce an additional establishment cause to allow RAN (Radio Access Network) node to differentiate low priority MTC traffic signalling (and possibly other MTC traffic/signalling) from other traffic signaling for both UMTS and LTE. On the other hand, according to TS 36.413 v9.4.0, MME (Mobility Management Entity) can notify the eNB (Evolved Node B) by an OVERLOAD START message when it becomes overloaded (as shown in FIG. 5A). In general, the eNB receiving the OVERLOAD START message shall assume the MME from which it receives the message as being in an overloaded state. If a UE (user equipment) attempts to gain access during the MME overloading, it is likely rejected by the eNB and enters the waiting period. The eNB can signal a value (may be called "wait time") to the LE and the value is used to decide the duration of the waiting period. The detailed operation of waiting period which is implemented by a timer 1302 can be found in TS 36.331 v9.4.0 and TS 36.331 v10.0.0. For MTC devices, a longer wait time comparing to 1302 could be used. Although the value range of the wait time for MTC devices has not been decided, the time period may be up to one hour according to S2-105318.

It has been further discussed and agreed to introduce a new parameter for wait time (may be called eWaitTime or "extended wait time") which is used to prevent a MTC device (using a cause, e.g. delay tolerant or low priority, indicated in a connection request or a connection setup complete message) from sending connection request in CN overload situation. The difference between 1302 and eWaitTime is that eWaitTime has a larger maximum value. The eWaitTime may be included in a connection release message or a connection reject message. It is confirmed that the eWaitTime is handled at NAS (Non-Access Stratum) layer. According to NAS layer specification TS 23.401 v10.2.0 (which is referenced by TS 36.331), the Mobility Management back-off timer corresponds to the eWaitTime in lower layers. e.g. RRC layer and is used for overload conditions. While the Mobility Management hack-off timer is running, the UE shall not initiate any NAS request except for Service Users emergency services.

Figure 5B:
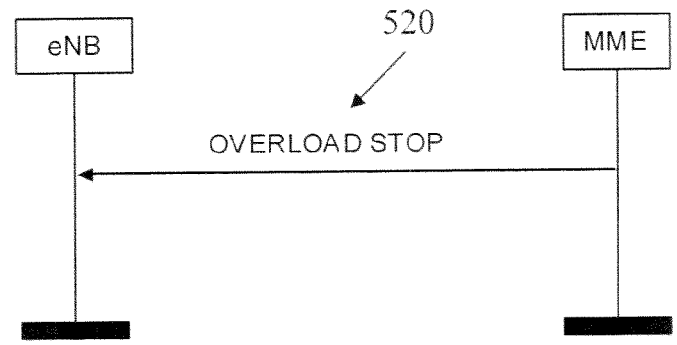

In addition, according to TS 36.413 v9.4.0, when the MME overloading is ended. MIME could notify the end of overloading to the eNB by OVERLOAD STOP message (as shown in FIG. 5B). The eNB receiving the OVERLOAD STOP message shall assume that the overload situation at the MME from which it receives the message has ended and shall resume normal operation towards this MME. Since the eNB may not know when the MME overloading ends before receiving the OVERLOAD STOP message, the eNB may possibly give a conservative (e.g. relative longer) wait time to the UE. It can prevent the UE from making another attempt while the network is still overloading. In this case, when the eNB receives the OVERLOAD STOP message, it is likely that the UE rejected by the eNB is still waiting. Currently there is no way to inform the UE about the end of Overloading. The UE can only wait for the wait timer expiry and some extra delay is caused. However, if the eNB has a better understanding about when the MME overload may stop, the extra delay of the UE due to wait time could be reduced.

Figure 5C:
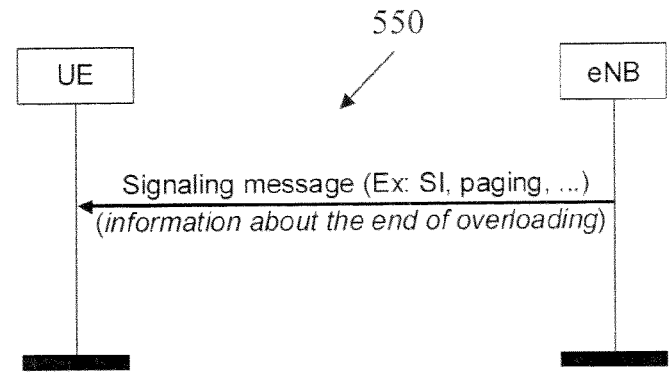

In one embodiment, the UE is informed about the end of CN overload through system information (as shown in FIG. 5C). In an alternative embodiment, the UE is informed about the end of CN overload through a paging message (as shown in FIG. 5C). The paging message could be a MTC (Machine-type Communication) specific message or a message addressed to a special RNTI (Radio Network Temporary Identifier) shared by a group of UEs.

In addition, due to a potentially large value of eWaitTime, the UE may send connection request again tens of minutes after the relief of CN overload. Such a long waiting period after the relief of CN overload is unnecessary. One way to solve the issue is that eNB transmits a paging to inform the UE to send connection request for paging response. However, the UE is not allowed to send connection request when a timer corresponding to eWaitTime is running, like T302 is running. Adding some additional information in current paging message could be used to indicate the relief of CN overload. However, the message structure needs to be updated and the signalling overhead is increased.

In one embodiment, a UE would react to a paging message which pages the UE even when the UE is in the wait time due to eWaitTime. In an alternative embodiment, the UE considers the wait time due to eWaitTime as finished upon receiving a paging message which pages the UE. In another embodiment, the UE performs any of the above actions upon receiving a special PDCCH signaling.

In one embodiment, when a UE is in a wait time due to eWaitTime (e.g. a timer corresponding to eWaitTime in the UE is running) and the UE is paged by a paging message, the UE is allowed to initiate a RRC connection establishment procedure. The RRC connection establishment procedure is specified in TS 36.331 v10.0.0 and TS 25.331 v10.2.0. Or alternatively, when a UE is in a Wait time due to eWaitTime, (e.g., a timer corresponding to eWaitTime in a UE is running) and the UE is paged by a paging message), the UE leaves the wait time (e.g., stops the timer).

In addition, the paging message does not include additional information (such as information related to CN overload). In other words, as an example, the paging message has the same content specified in TS 36.331 v10.0.0 or TS 23.331 v10.2.0. Furthermore, an establishment cause in a RRC connection request message (as specified in TS 36.331 v10.0.0 and TS 25.331 v10.2.0) corresponding to the connection establishment procedure is set to delay tolerant (or low priority). Alternatively, an indication in a RRC connection setup complete message (as specified in TS 36.331 v10.0.0 and TS 25.331 v10.2.0) corresponding to the connection establishment procedure is set to delay tolerant (or low priority).

Figure 6:
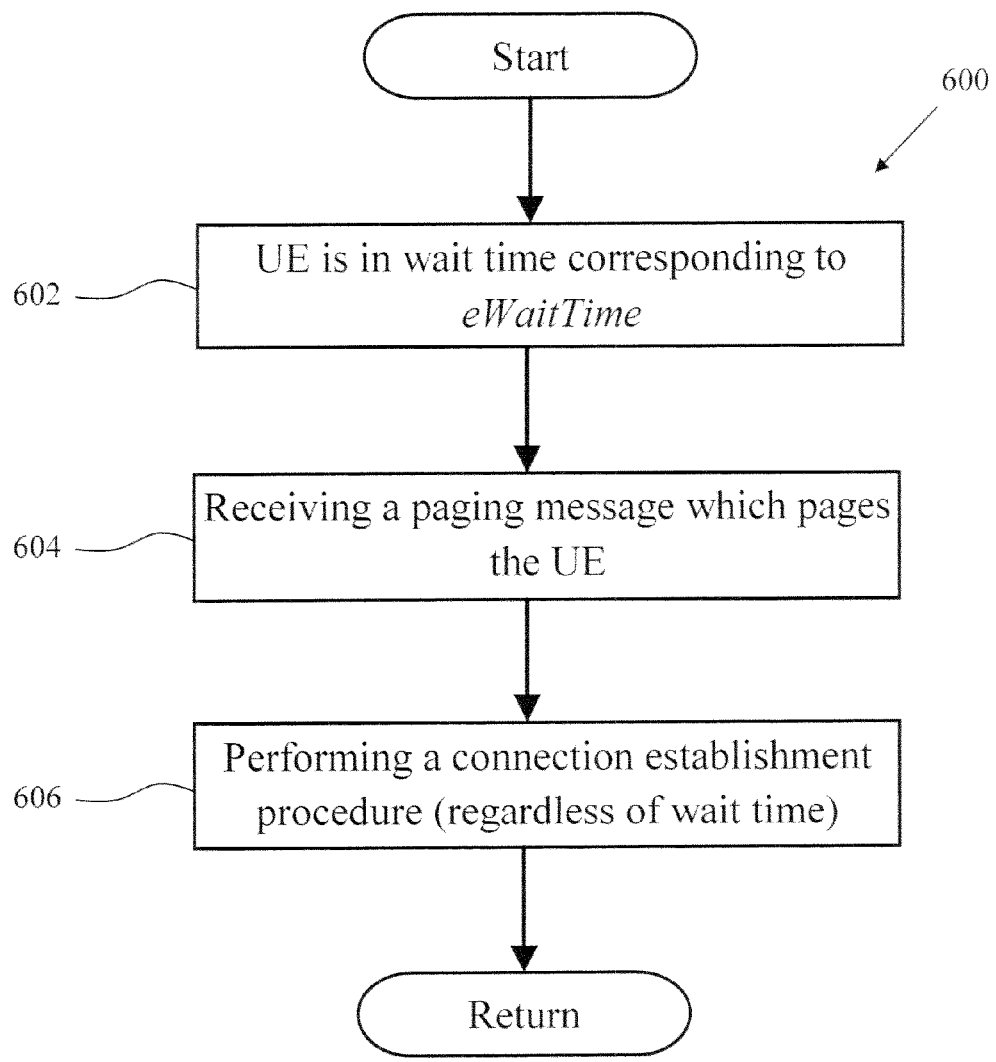
FIG. 6 shows a method of improving wait time according to one exemplary embodiment.

A method 600 for improving the wait time according embodiment is shown in FIG. 6. Upon receiving a message indicating an eWaitTime, a UE enters and remains in a wait time period corresponding to the eWaitTime as shown in step 602. In one embodiment, the eWaitTime is carried by a RRC Connection Reject message or a RRC Connection Release message. In addition, the wait time period is controlled by a timer that may be started upon receiving the eWaitTime. In an alternative embodiment, the UE is a MTC device, and may provide a delay tolerant or low priority indication to the network.

Furthermore, while in the wait time period, the UE does not initiate a connection request with a specific cause. In one embodiment, the specific cause could be delay tolerant or low priority. In step 604, the UE receives a paging message that pages the UE. In response to receiving the paging message, the UE performs a RRC Connection Establishment procedure (regardless of the wait time). In addition, the UE is allowed to initiate a connection request with a cause set to emergency during the wait time period and the wait time period is not affected as discussed in TS 23.401 V 10.2.0). Furthermore, the UE does not response to a paging message which does not page the UE. The establishment cause of the RRC Connection Establishment procedure may be set to mobile terminating calls. Additionally, the wait time period may not be affected (e.g., not considered as finished) due to the RRC Connection Establishment procedure.

Figure 7:
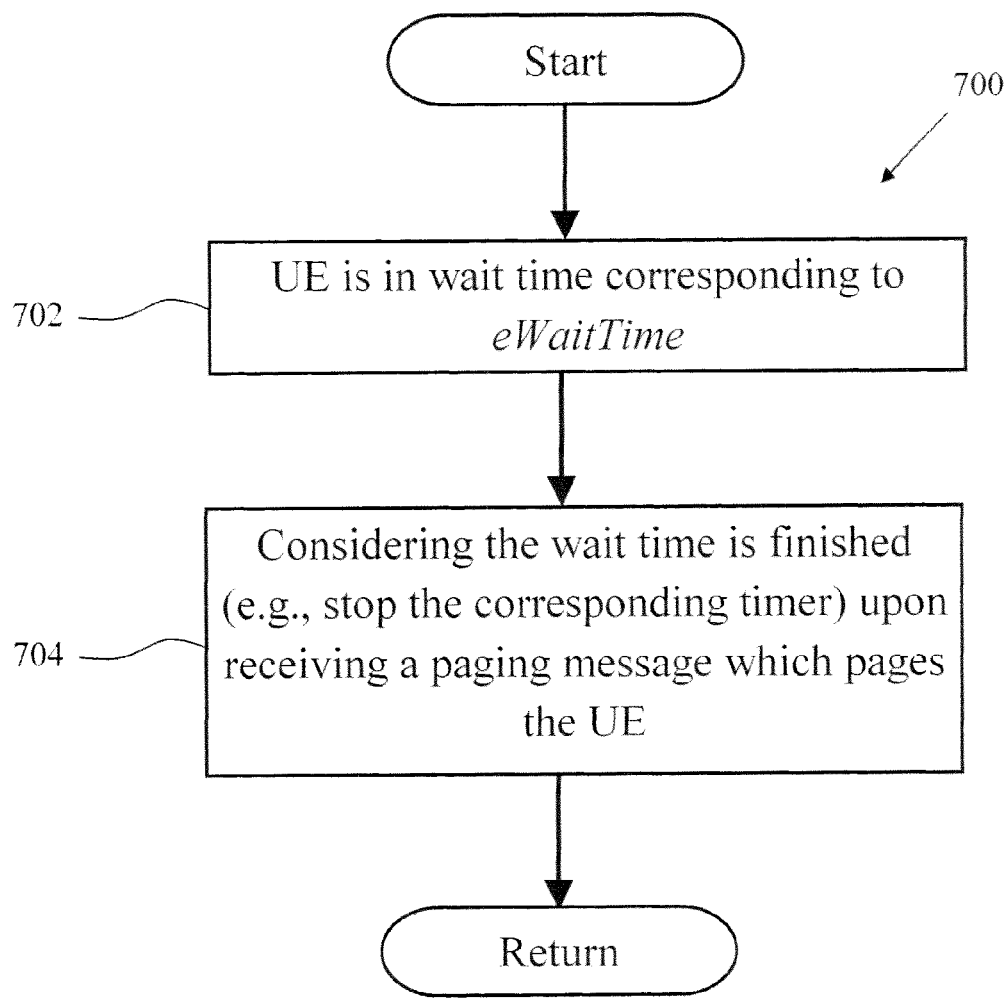
FIG. 7 illustrates a method of improving wait time according to one exemplary embodiment.

An alternative method 700 for improving the wait time according to one embodiment is shown in FIG. 7. Upon receiving a message indicating an eWaitTime, a UE enters and remains in a wait time period corresponding to an eWaitTime as shown in step 702. In one embodiment, the eWaitTime is carried by a RRC Connection Reject message or a RRC Connection Release message. In addition, the wait time period is controlled by a timer that may be started upon receiving the eWaitTime. In an alternative embodiment, the UE is a MTC device, and may provide a delay tolerant or low priority indication to the network.

While in the wait time period, the UE does not initiate a connection request with a specific cause. In one embodiment, the specific cause could be delay tolerant or low priority. In step 704, the UE considers the wait time period as finished (e.g., stopping a timer corresponding to the wait time period) upon receiving a paging message that pages the UE. In addition, the UE initiates a RRC Connection Establishment procedure in response to the paging message. The establishment cause of the RRC Connection Establishment procedure may be set to mobile terminating calls. Furthermore, the UE is allowed to initiate a connection request with a cause set to emergency during the wait time period and the wait time period is not affected (as discussed in TS 23.401 V 10.2.0). Additionally, the UE does not consider the wait time period as finished when receiving a paging message which does not page the UE.

In another embodiment, the UE considers the wait time period as finished upon receiving a PDCCH (Physical Downlink Control Channel) signal.

Referring to FIG. 3, which is a functional block diagram of a communication device according to one exemplary embodiment, the communication device 300 includes a program code 312 stored in memory 310. The CPU 308 executes the program code 312 to perform a method for log reporting according to various aspects of the disclosure as described above. The CPU 308 can also execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory. ROM memory, EPROM memory. EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method implemented in a user equipment (UE) for improving wait time in a wireless communication system comprising:
   receiving, at the UE, a message indicating an eWaitTime;
   entering, at the UE, a wait time period corresponding to the eWaitTime in the message received at the UE, wherein the UE is not allowed to initiate a Radio Resource Control (RRC) connection request with a specific cause during the wait time period; and
   considering, at the UE, the wait time period as finished upon receiving a paging message that pages the UE;
   wherein considering the wait time period as finished comprises the UE stops a timer corresponding to the wait time period.

2. The method of claim 1, further comprises:
   the UE initiates a connection establishment procedure in response to the paging message that pages the UE.

3. The method of claim 1, wherein the specific cause is delay tolerant or low priority.

4. The method of claim 1, wherein the UE is allowed to initiate a RRC connection request with a cause set to emergency during the wait time period and the wait time period is not affected.

5. The method of claim 1, wherein the UE does not consider the wait time period as finished when receiving a paging message that does not page the UE.

6. The method of claim 1, wherein the message is a RRC Connection Reject message or a RRC Connection Release message.

7. The method of claim 1, wherein the paging message contains overloading information to indicate an end of CN overloading.

8. The method of claim 1, wherein the wait time period is controlled by a timer.

9. The method of claim 1, wherein the wait time period is started upon receiving the eWaitTime.

10. A communication device for use in a wireless communication system, the communication device comprising:
    a control circuit;
    a processor installed in the control circuit; and
    a memory installed in the control circuit and coupled to the processor;
    wherein the processor is configured to execute a program code stored in memory in a user equipment (UE) to:
       receive, at the UE, a message indicating an eWaitTime;
       enter, at the UE, a wait time period corresponding to the eWaitTime in the message received at the UE, wherein the UE is not allowed to initiate a Radio Resource Control (RRC) connection request with a specific cause during the wait time period; and
       consider, at the UE, the wait time period as finished upon receiving a paging message that pages the UE;
       wherein considering the wait time period as finished comprises stopping a timer corresponding to the wait time period.

11. The communication device of claim 10, wherein the processor is further configured to execute a program code stored in memory to initiating a connection establishment procedure in response to the paging message that pages the UE.

12. The communication device of claim 10, wherein the specific cause is delay tolerant or low priority.

13. The communication device of claim 10, wherein the UE is allowed to initiate a RRC connection request with a cause set to emergency during the wait time period and the wait time period is not affected.

14. The communication device of claim 10, wherein the UE does not consider the wait period as finished when receiving, a paging message that does not page the UE.

15. The communication device of claim 10, wherein the message is a RRC Connection Reject message or a RRC Connection Release message.

16. The communication device of claim 10, wherein the paging message contains overloading information to indicate an end of CN overloading.

17. The communication device of claim 10, wherein the wait time period is controlled by a timer.

18. The communication device of claim 10, wherein the wait time period is started up receiving the eWaitTime.

* * * * *